(12) United States Patent
Liu et al.

(10) Patent No.: US 12,409,890 B2
(45) Date of Patent: Sep. 9, 2025

(54) VEHICLE BODY STRUCTURE AND VEHICLE

(71) Applicant: GUANGZHOU AUTOMOBILE GROUP CO., LTD., Guangzhou (CN)

(72) Inventors: Jingmin Liu, Guangzhou (CN); Peifeng Luo, Guangzhou (CN); Yinchao Qian, Guangzhou (CN); Jianqiang Zhong, Guangzhou (CN); Ming Liu, Guangzhou (CN); Zehua Yi, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 377 days.

(21) Appl. No.: 18/015,031

(22) PCT Filed: Jun. 12, 2021

(86) PCT No.: PCT/CN2021/099907
§ 371 (c)(1),
(2) Date: Jan. 6, 2023

(87) PCT Pub. No.: WO2022/017062
PCT Pub. Date: Jan. 27, 2022

(65) Prior Publication Data
US 2023/0271650 A1 Aug. 31, 2023

(30) Foreign Application Priority Data

Jul. 22, 2020 (CN) .......................... 202010713586.1

(51) Int. Cl.
*B62D 21/15* (2006.01)
*B60J 5/04* (2006.01)
(Continued)

(52) U.S. Cl.
CPC .......... *B62D 21/152* (2013.01); *B60J 5/0429* (2013.01); *B60J 5/0437* (2013.01); *B60J 5/0443* (2013.01); *B62D 25/04* (2013.01); *B62D 25/082* (2013.01)

(58) Field of Classification Search
CPC ...... B60J 5/0429; B60J 5/0422; B60J 5/0423; B60J 5/0426; B60J 5/0427; B60J 5/0432;
(Continued)

(56) References Cited

U.S. PATENT DOCUMENTS

| 8,162,360 B2 * | 4/2012 | Takaya | .................. E05B 79/04 |
| | | | 292/336.3 |
| 2002/0093219 A1 * | 7/2002 | Traister | .................. B60J 5/0433 |
| | | | 296/146.6 |

(Continued)

FOREIGN PATENT DOCUMENTS

| CN | 101585311 A | 11/2009 |
| CN | 208452753 U | 2/2019 |
| DE | 102013019720 A1 | 5/2015 |

*Primary Examiner* — Dennis H Pedder
(74) *Attorney, Agent, or Firm* — ScienBiziP, P.C.

(57) ABSTRACT

A body structure including an A-pillar, a door assembly, an engine compartment assembly and an upper longitudinal beam of engine compartment, and also includes a reinforcement plate of upper longitudinal beam, a first anti-crash beam, and a second anti-crash beam. The front end of the reinforcement plate of upper longitudinal beam is connected to the middle portion of the upper longitudinal beam of engine compartment. The rear end of the reinforcement plate of upper longitudinal beam is connected to the engine compartment assembly. The upper longitudinal beam of engine compartment and the reinforcement plate of upper longitudinal beam form a first triangle area on the engine compartment assembly. The first anti-crash beam and the second anti-crash beam are installed on the door assembly along a direction from the front to the rear of the vehicle (Continued)

body. The first anti-crash beam is located above the second anti-crash beam.

16 Claims, 3 Drawing Sheets

(51) Int. Cl.
*B62D 25/04* (2006.01)
*B62D 25/08* (2006.01)

(58) Field of Classification Search
CPC ...... B60J 5/0443; B60J 5/0444; B60J 5/0447; B60J 5/0448; B60J 5/0462; B62D 25/04; B62D 25/082; B62D 21/152
USPC ........ 296/187.09, 1, 146.6, 203.1, 2, 193.09
See application file for complete search history.

(56) References Cited

U.S. PATENT DOCUMENTS

| | | | |
|---|---|---|---|
| 2012/0074720 A1* | 3/2012 | Johnson | B21D 5/14 |
| | | | 72/176 |
| 2016/0194031 A1* | 7/2016 | Yamamoto | B62D 21/152 |
| | | | 296/187.1 |

* cited by examiner

VEHICLE BODY STRUCTURE AND VEHICLE

FIELD

The present disclosure herein generally relates to vehicles, and more particularly, to a vehicle body structure and a vehicle having the vehicle body structure.

BACKGROUND

With continuous development of vehicle industry, people pay more and more attention to the crash performance of a vehicle. After 2018, C-IASI (China Insurance Vehicle Safety INDEX) introduced the evaluation procedures of IIHS (Insurance Institute for Highway Safety) into the vehicle evaluation system. The Small Overlap Barrier is one of the key items of C-IASI. In a frontal 25% offset crash test, the vehicle is crashed into a fixed rigid barrier at a speed of 64.4±1 km/h, at an overlap rate of 25%=1%. The smaller the deformation of the passenger compartment after the crash, the better the performance is said to be.

At present, domestic vehicle manufacturers do not apply effective measures to improve the performance in small overlap barrier in particular, and the result of small overlap barrier does not meet certain standards. The existing method is to improve the strength of the local structure of the vehicle body to reduce the deformation of the vehicle body in small overlap barrier. However, the result is that A-pillar cannot achieve the desired performance or the weight of the vehicle body then becomes too heavy.

The vehicle body in the related art includes a floor, on which a floor longitudinal beam and an outer side plate are arranged. The A-pillar is fixedly arranged on the inner side of the outer side plate. The rear ends of the front longitudinal beam are fixed to the floor, the A-pillar, and the front wall plate. The auxiliary front longitudinal beam is fixed below the front longitudinal beam. A front crash beam is provided on the front end of the front longitudinal beam, and a front auxiliary crash beam is provided on the front end of the auxiliary front longitudinal beam. The rear longitudinal beam is arranged on the floor. First to third rear cross beams are spaced from each other, from the front to the back. A front connection portion and a rear connection portion are provided at the lower end of the C-pillar. The front connection portion at the lower end of the C-pillar is fixed to the rear longitudinal beam and the second rear cross beam, and the rear connection portion at the lower end of the C-pillar is fixed to the rear longitudinal beam and the third rear cross beam. Both ends of the rear cross beam of the top cover are fixed to top ends of the left and right C-pillars, so as to strengthen the vehicle body structure and improve the vehicle performance in relation to small overlap barrier.

The above technology improves the performance of the vehicle during the small overlap barrier by strengthening the local structure of the vehicle body, but also results in heavy weight and high cost. The performance improvement in relation to small offset vehicle crash is not dramatic.

SUMMARY

The vehicle body structure and the vehicle are used to avoid large weight and high cost of the vehicle body, caused by, strengthening the local structure of the vehicle body to improve the substandard performance in small offset vehicle crashes.

To overcome the above shortcomings, the present disclosure provides a vehicle body structure including an A-pillar, a door assembly, an engine compartment assembly, an upper longitudinal beam of engine compartment, a reinforcement plate of upper longitudinal beam, a first anti-crash beam, and a second anti-crash beam. A front end of the reinforcement plate of upper longitudinal beam is connected to a middle portion of the upper longitudinal beam of engine compartment, a rear end of the reinforcement plate of upper longitudinal beam is connected to the engine compartment assembly, the upper longitudinal beam of the engine compartment and the reinforcement plate of upper longitudinal beam form a first triangle area on the engine compartment assembly.

The first anti-crash beam and the second anti-crash beam are installed on the door assembly along a direction of front to rear of the vehicle body, and the first anti-crash beam is disposed above the second anti-crash beam.

Preferably, the first anti-crash beam is inclined downward toward the rear of the vehicle body and set on the door assembly, and the first anti-crash beam and a lower frame of window form a second triangle area on the door assembly.

Preferably, the second anti-crash beam and the reinforcement plate of upper longitudinal beam are in a straight line.

Preferably, cross-sections of the first anti-crash beam and the second anti-crash beam are irregular concave-convex structures.

Preferably, the present disclosure further includes a third anti-crash beam below the second anti-crash beam, wherein the third anti-crash beam is installed on the door assembly along the direction of front to rear of the vehicle body.

Preferably, the second anti-crash beam and the third anti-crash beam form a third triangle area on the door assembly, and the third anti-crash beam is horizontally installed.

Preferably, a front end of the first anti-crash beam is threaded with the door assembly near an upper hinge mounting point, a front end of the third anti-crash beam is threaded with the door assembly near a lower hinge mounting point.

Preferably, rear ends of the first anti-crash beam, the second anti-crash beam, and the third anti-crash beam are fixed to the door assembly by soldering, and rear ends of the second anti-crash beam and the third anti-crash beam are connected together.

Preferably, the present disclosure further includes an A-pillar reinforcing block, wherein the A-pillar reinforcing block is fixed to the A-pillar near a lower hinge mounting point.

Preferably, a middle portion of the A-pillar reinforcement block defines a clamping groove for clamping with an edge of the A-pillar, and the A-pillar reinforcement block and the third anti-crash beam are in a straight line.

Preferably, the A-pillar reinforcing block is a cast structure, the middle portion of the A-pillar reinforcing block includes a conical block protruding outwards with respect to two ends of the A-pillar reinforcing block, and the clamping groove extends through a bottom of the conical block.

Preferably, the present disclosure further includes a fourth anti-crash beam, the fourth anti-crash beam is installed in front of the engine compartment assembly, the fourth anti-crash beam is bent away from the engine compartment assembly, and a radius of curvature at both ends of the fourth anti-crash beam is smaller than a radius of curvature at a middle portion of the fourth anti-crash beam.

Preferably, the radius of curvature at both ends of the fourth anti-crash beam is 100 mm to 140 mm, and the radius of curvature at the middle portion of the fourth anti-crash beam is 2500 mm to 2900 mm.

Another object of the present disclosure is to provide a vehicle including the vehicle body structure mentioned above.

The vehicle body structure and the vehicle of the present disclosure have the following advantages.

The reinforcement plate of upper longitudinal beam, the first anti-crash beam, and the second anti-crash beam are used to modify the force transmission structure and increase the force transmission paths during crash. The reinforcement plate of upper longitudinal beam and the upper longitudinal beam of engine compartment form the first triangle area. Thus, the crash force can be decomposed and transferred to the rear, thereby improving the performance in small offset vehicle crash.

As such, lame weight and high cost of the vehicle body, caused by strengthening the local structure of the vehicle body to improve the substandard performance of small offset vehicle crash, are avoided.

The first anti-crash beam and the window lower frame form a second triangle area. The second anti-crash beam and the third anti-crash beam form a third triangle area on the door assembly. Thus, the crash force can be decomposed and transferred to the rear, thereby improving the performance in small offset vehicle crash.

Furthermore, the fourth anti-crash beam is arranged in front of the engine compartment assembly, so that when a small overlap barrier occurs, the barrier is subjected to a force of component facing outward through the two ends of the fourth anti-crash beam. Thus, rigid contact between the barrier and the vehicle body is avoided, reducing the impact of the chassis on the vehicle body, and thus improving the crash performance in small overlap barriers.

Furthermore, the present disclosure further adds the A-pillar reinforcing block at the connection of the A-pillar, which improves the rigidity of vehicle body. Furthermore, when a small overlap barrier occurs, the connection between the wheels and the chassis is destroyed, thereby reducing the impact of the chassis on the vehicle body, reducing deformation of passenger compartment, and improving the performance in small overlap barriers.

DESCRIPTION OF REFERENCES OF THE DRAWINGS

1. A-pillar; 2, door assembly; 21, lower frame of window: 3, engine compartment assembly; 41, upper longitudinal beam of engine compartment; 42, reinforcement plate of upper longitudinal beam; 51, first anti-crash beam; 52, second anti-crash beam; 53, third anti-crash beam; 54, fourth anti-crash beam; 6, A-pillar reinforcement block; 61, slot; 62, conical block; 7, B-pillar; 8, wheel; A, first triangle area; B, the second triangle area; C, third triangle area.

DETAILED DESCRIPTION OF THE INVENTION

Implementations of the present technology will now be described, by way of embodiment, with reference to the attached figures. The following embodiments are used to explain the present disclosure, but are not used to limit the scope of the present disclosure.

In the description of the present disclosure, it should be understood that the terms "first", "second", etc. are used to describe various information but not limited by these information. The terms are only used to distinguish the same type of information from each other. For example, without departing from the scope of the present disclosure, "first" information can also be referred to as "second" information, and similarly, "second" information can also be referred to as "first" information.

It should be noted that the attached figures of the present technology are schematic, and do not show all components of the vehicle body structure. The core principles when components are added to this system is the same as that of the present technology.

Figure 1:
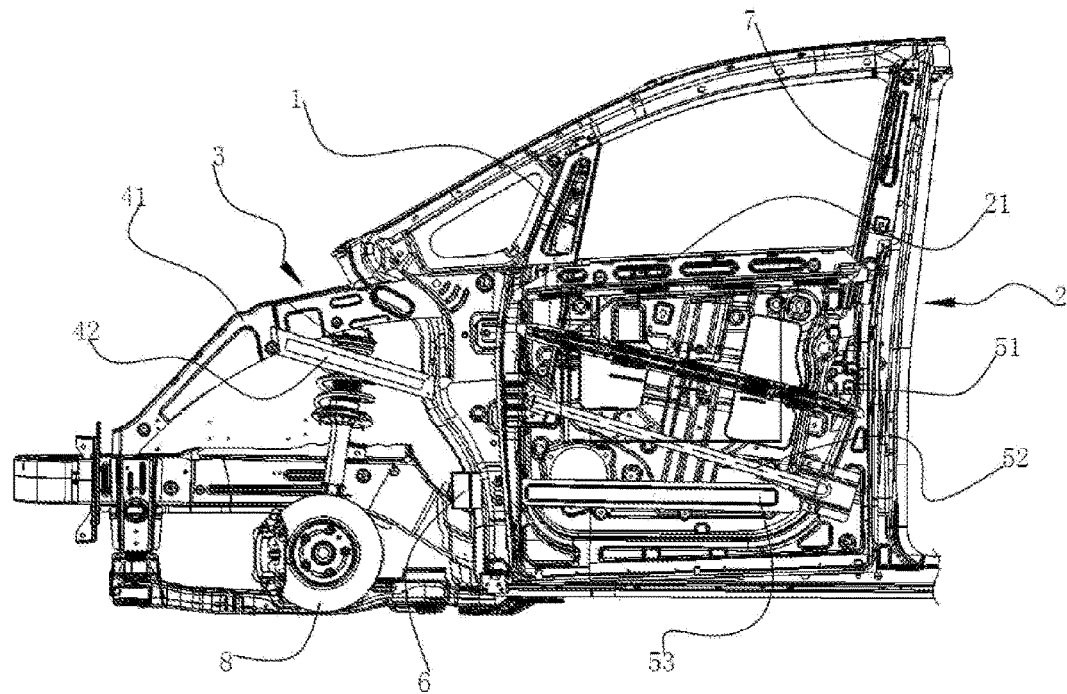
FIG. 1 is a side diagrammatic view of a vehicle body structure according to an embodiment of the present disclosure.

Referring to FIG. 1, a vehicle body structure is provided according to an embodiment of the present disclosure, which includes an A-pillar 1, a door assembly 2, an engine compartment assembly 3, and an upper longitudinal beam of engine compartment 41. A reinforcement plate of upper longitudinal beam 42, a first anti-crash beam 51, and a second anti-crash beam 52 are also included. These settings modify the vehicle body force transmission structure and increase the force transmission paths during crash.

The front end of the reinforcement plate of upper longitudinal beam 42 is connected to the middle portion of the upper longitudinal beam of engine compartment 41. The rear end of the reinforcement plate of upper longitudinal beam 42 is connected to the engine compartment assembly 3. The upper longitudinal beam of engine compartment 41 and the reinforcement plate of upper longitudinal beam 42 form a first triangle area A on the engine compartment assembly 3. The first anti-crash beam 51 and the second anti-crash beam 52 are installed on the door assembly 2 along direction of front to rear of the vehicle body. The first anti-crash beam 51 is disposed above the second anti-crash beam 52.

Figure 2:
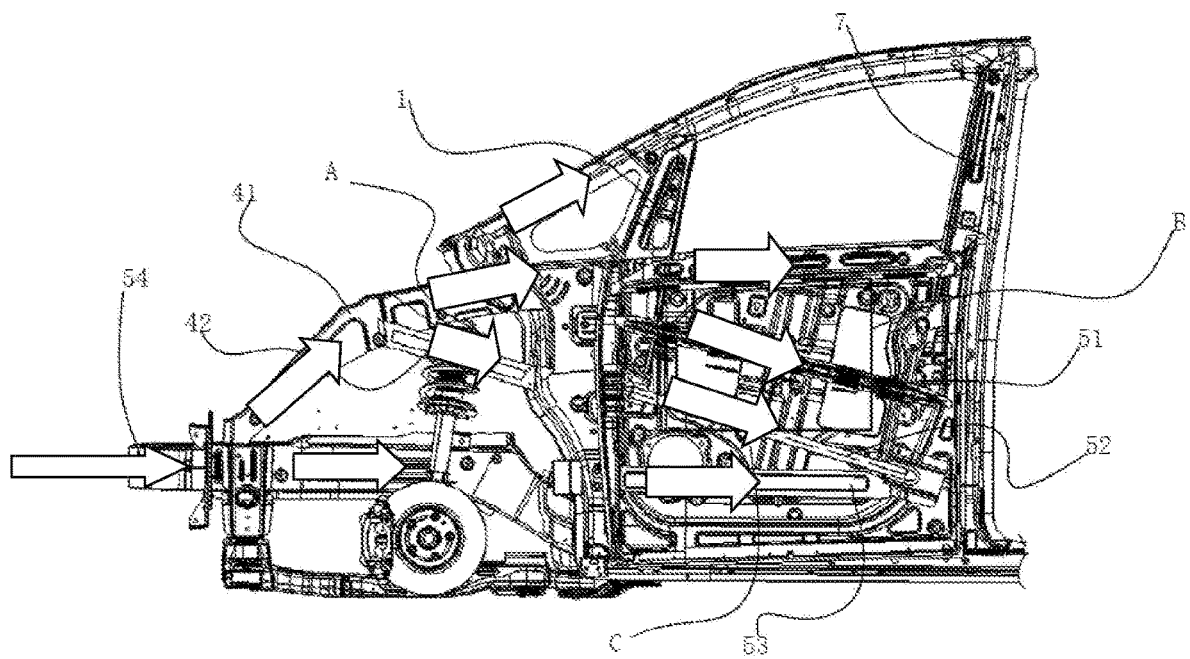
FIG. 2 is a diagrammatic view of force transmission path according to an embodiment of the present disclosure.

Based on the vehicle body structure disclosed, the reinforcement plate of upper longitudinal beam 42, the first anti-crash beam 51, and the second anti-crash beam 52 modify the force transmission structure and increase the force transmission path during crash. Referring to FIG. 2, white arrows shown in FIG. 2 indicate the directions of force transmission. The reinforcement plate of upper longitudinal beam 42 and the upper longitudinal beam of ermine compartment 41 form the first triangle area A, resulting in the impact force of small overlap barrier being transferred to the first triangle area A through the front of the upper longitudinal beam of engine compartment 41. The first triangle area A decomposes the transferred impact force and transfers it to the rear to improve the performance in small overlap barrier.

Referring to FIG. 2, in this embodiment, the first anti-crash beam 51 is inclined downward toward the rear of the vehicle body and arranged on the door assembly 2. The first anti-crash beam 51 and the window lower frame 21 form a second triangle area B on the door assembly 2. The second triangle area B divides impact force transmitted from the rear of the upper longitudinal beam of engine compartment 41 into two portions. One portion is transmitted along the window lower frame 21, and the other portion is transmitted along the first anti-crash beam 51.

Referring to FIG. 1, in this embodiment, the second anti-crash beam 52 and the reinforcement plate of upper longitudinal beam 42 are located on a straight line, which transfers the impact force transmitted through the reinforcement plate of upper longitudinal beam 42 directly to the rear. In addition, the cross-sections of the first anti-crash beam 51 and the second anti-crash beam 52 are irregular concave-convex structures, improving the stiffness of the first anti-crash beam 51 and the second anti-crash beam 52 and also increasing the energy-absorbing characteristics of the vehicle.

Referring to FIGS. 1 and 2, in this embodiment, a third anti-crash beam 53 is arranged below the second anti-crash beam 52, and the third anti-crash beam 53 is installed on the door assembly 2 along the direction from the front to rear of the vehicle body. The second anti-crash beam 52 and the third anti-crash beam 53 form a third triangle area C on the door assembly 2. The triangle structure C bears the impact force transmitted from the reinforcement plate of upper longitudinal beam 42, and transferring the impact force to the B-pillar 7 and the vehicle threshold (not shown). Preferably, in order to improve the stiffness of the third anti-crash beam 53, the third anti-crash beam 53 is horizontally installed.

In this embodiment, the front end of the first anti-crash beam 51 is threaded with the door assembly 2 near the upper hinge mounting point. The front end of the third anti-crash beam 53 is threaded with the door assembly 2 near the lower hinge mounting point. The rear end of the first anti-crash beam 51, the second anti-crash beam 52, and the third anti-crash beam 53 are fixed to the door assembly 2 by soldering. The rear end of the second anti-crash beam 52 and the rear end of the third anti-crash beam 53 are connected together. Thus, the rigidity of the hinge mounting points of the door is also improved.

Figure 3:
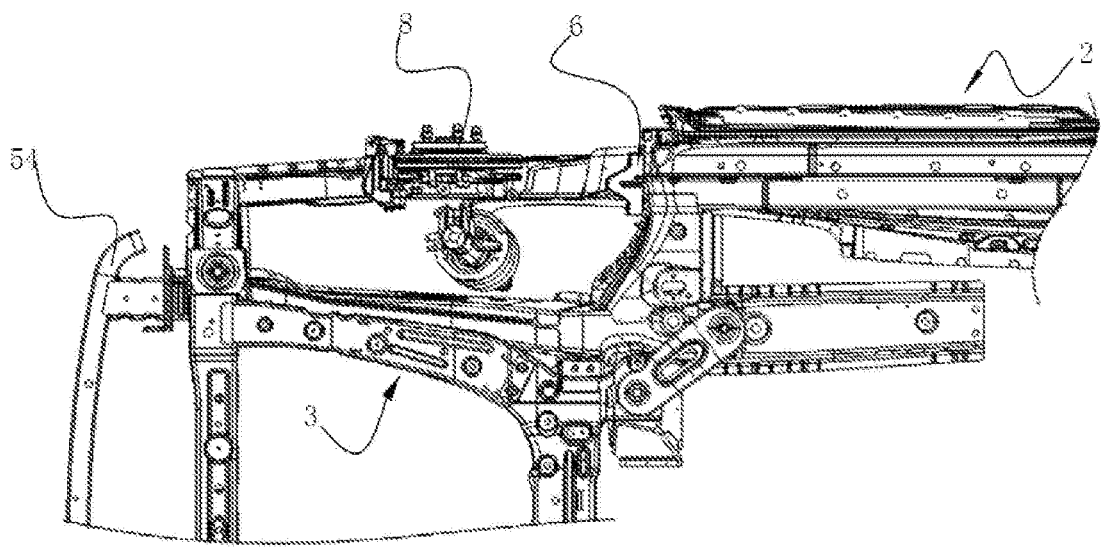
FIG. 3 is a top diagrammatic view of a vehicle body structure according to an embodiment of the present disclosure.

Referring to FIG. 3, in this embodiment, a fourth anti-crash beam 54 is further included, which is connected to the engine compartment assembly 3. The fourth anti-crash beam 54 is installed in front of the engine compartment assembly 3, and the fourth anti-crash beam 54 is bent away from the engine compartment assembly 3. The radius of curvature at both ends of the fourth anti-crash beam 54 is smaller than the radius of curvature at its middle portion. Due to such structural design of the ends of the fourth anti-crash beam 54, the barrier may suffer from a component of force when small overlap barrier occurs. At the same time, the reverse force that the vehicle receives may cause the vehicle itself to slide outward, thereby avoiding rigid contact between the barrier and the vehicle body that causes greater impact on the vehicle body. The impact of the chassis on the vehicle body is reduced, thereby improving the performance in small overlap barrier.

In this embodiment, the radius of curvature of both ends of the fourth anti-crash beam 54 is 100 mm to 140 mm, and preferably 110 mm, 120 mm, or 130 mm. The radius of curvature of the middle portion of the fourth anti-crash beam 54 is 2500 mm to 2900 mm, and preferably 2600 mm, 2700 mm, or 2800 mm. Thus, rigid crash between the barrier and the vehicle body is avoided.

Figure 4:
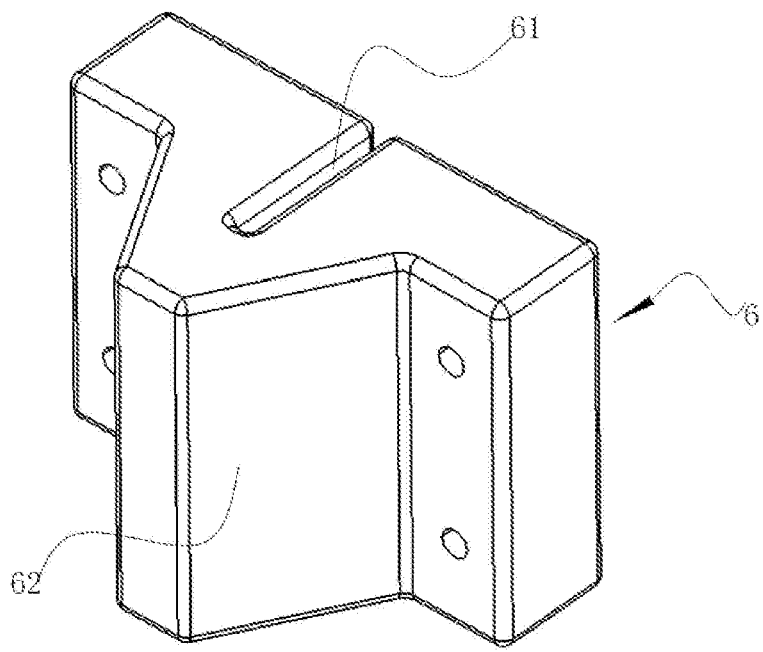
FIG. 4 is a diagrammatic view of an A-pillar reinforcement block according to an embodiment of the present disclosure.
Figure 5:
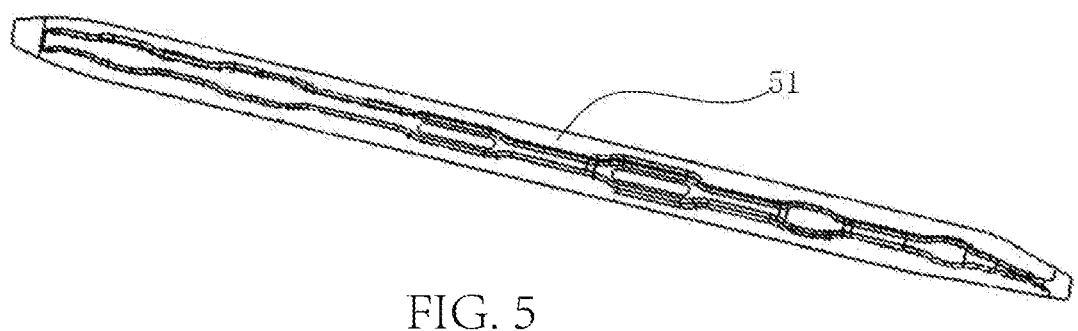
FIG. 5 is a diagrammatic view of a first anti-crash beam and a second anti-crash beam according to an embodiment of the present disclosure.
Figure 6:
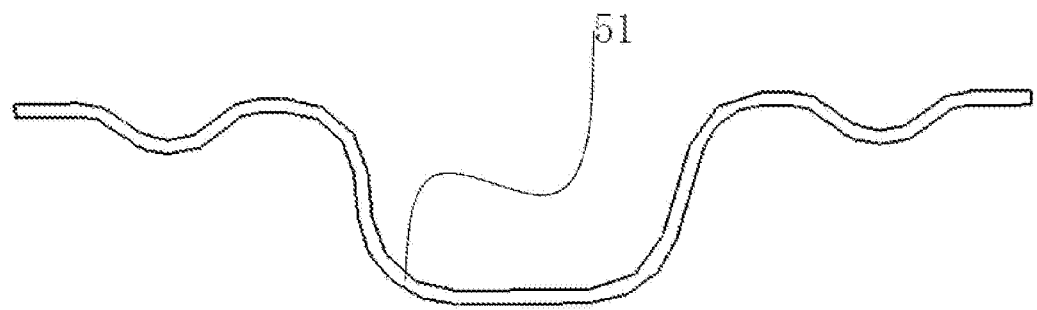
FIG. 6 is a cross-sectional view of the first anti-crash beam and the second anti-crash beam according to an embodiment of the present disclosure.
Figure 7:
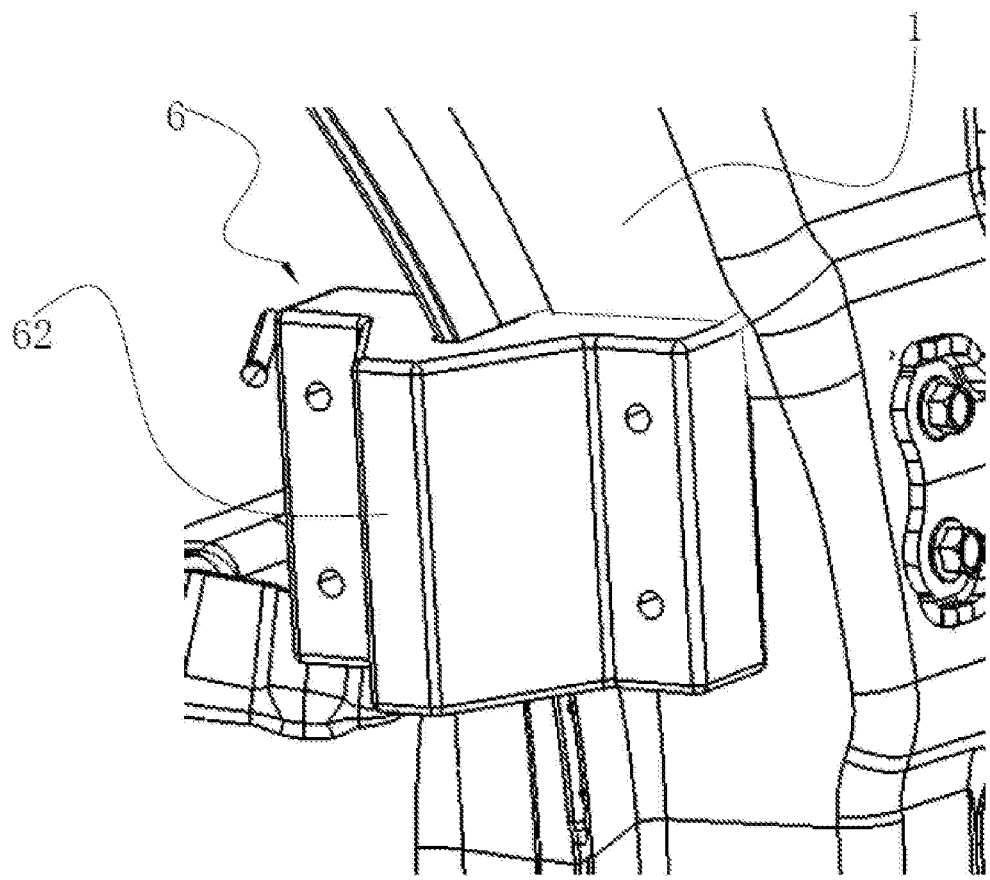
FIG. 7 is a diagrammatic view of the A-pillar reinforcement block installed according to an embodiment of the present disclosure.

Referring to FIGS. 4 and 7, in this embodiment, an A-pillar reinforcement block 6 is further included, which is fixed to a portion of the A-pillar near the lower hinge mounting point. The middle portion of the A-pillar reinforcement block 6 defines a slot 61 for clamping with the edge of the A-pillar 1, which improves the rigidity of the vehicle body. At the same time, the A-pillar reinforcing block 6 and the third anti-crash beam 53 are in a straight line, decomposing the crash force and transferring the crash force towards the back when small overlap barrier occurs.

In this embodiment, the A-pillar reinforcement block 6 is a cast structure, and its middle portion includes a conical block 62 that protrudes outwards relative to its two ends. Both ends of the A-pillar reinforcement block 6 are connected to both sides of the A-pillar 1 by threads. The clamping groove 61 in the middle portion extends through the bottom of the conical block 62, and the clamping groove 61 is connected to the edge of the A-pillar 1. When small overlap barrier occurs and the fourth anti-crash beam 54 experience being crushed to a certain extent, the vehicle subframe and the wheels 8 will move backward and collide with the top surface of the conical block 62 protruding from the middle portion of the A-pillar reinforcement block 6, resulting in a disconnection between the wheel 8 and the vehicle body. Thus, rigid crash among the subframe, the wheel hub and the vehicle body is avoided, greatly reducing the force suffered by the vehicle body.

In addition, a vehicle is further provided according to the present disclosure, which includes the vehicle body structure as mentioned above.

To sum up, the vehicle body structure provided by the present disclosure uses the reinforcement plate of upper longitudinal beam 42, the first anti-crash beam 51, and the second anti-crash beam 52 to modify the force transmission structure and increase the force transmission paths during crash. As shown in FIG. 2, the reinforcement plate of upper longitudinal beam 42 and the upper longitudinal beam of engine compartment 41 form the first triangle area A, so that the crash force of small overlap barrier is transmitted to the first triangle area A through the front of the upper longitudinal beam of engine compartment 41. The first triangle area A divides the transferred crash force into three portions, one is transferred to the upper portion of the A-pillar 1, one is transferred to the second triangle area B through the rear of the upper longitudinal beam of engine compartment 41, and one is transferred to the third triangle area C through the reinforcement plate of upper longitudinal beam 42. Thus, the crash force can be decomposed and transferred to the rear, thereby improving the performance in small offset vehicle crash. Large weight and high cost of the vehicle body, caused by strengthening the local structure of the vehicle body to improve the substandard performance of small offset vehicle crash, are avoided.

Furthermore, the fourth anti-crash beam 54 is arranged in front of the engine compartment assembly 3, so that when a small overlap barrier occurs, the barrier is subjected to a force of component facing outward through the two ends of the fourth anti-crash beam 54. Thus, rigid contact between the barrier and the vehicle body is avoided, reducing the impact of the chassis on the vehicle body, and thus improving the crash performance in small overlap barrier.

Furthermore, the present disclosure further adds the A-pillar reinforcing block 6 at the connection of the A-pillar, which improves the rigidity of vehicle body. Furthermore, when a small overlap barrier occurs, the connection between the wheels 8 and the chassis is destroyed, thereby reducing the impact of the chassis on the vehicle body, reducing deformation of passenger compartment, and improving the performance in small overlap barrier.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A vehicle body structure comprising:
an A-pillar, a door assembly, an engine compartment assembly, an upper longitudinal beam of engine compartment, a reinforcement plate of upper longitudinal beam, a first anti-crash beam, and a second anti-crash beam;
wherein a front end of the reinforcement plate of upper longitudinal beam is connected to a middle portion of the upper longitudinal beam of engine compartment, a rear end of the reinforcement plate of upper longitudinal beam is connected to the engine compartment assembly, the upper longitudinal beam of the engine compartment and the reinforcement plate of upper longitudinal beam form a first triangle area on the engine compartment assembly, the first anti-crash beam and the second anti-crash beam are installed on the door assembly along a direction of front to rear of the vehicle body, and the first anti-crash beam is disposed above the second anti-crash beam;
wherein the second anti-crash beam and the reinforcement plate of upper longitudinal beam are in a straight line.

2. The vehicle body structure as claimed in claim 1, wherein the first anti-crash beam is inclined downward toward the rear of the vehicle body and set on the door assembly, the first anti-crash beam and a lower frame of window form a second triangle area on the door assembly, and the second area is substantially a triangle area.

3. The vehicle body structure as claimed in claim 1, wherein cross-sections of the first anti-crash beam and the second anti-crash beam are irregular concave-convex structures.

4. The vehicle body structure as claimed in claim 1, further comprising a third anti-crash beam below the second anti-crash beam, wherein the third anti-crash beam is installed on the door assembly along the direction of front to rear of the vehicle body.

5. The vehicle body structure as claimed in claim 4, wherein the second anti-crash beam and the third anti-crash beam form a third triangle area on the door assembly, and the third anti-crash beam is horizontally installed.

6. The vehicle body structure as claimed in claim 4, wherein a front end of the first anti-crash beam is threaded with the door assembly near an upper hinge mounting point, a front end of the third anti-crash beam is threadedly connected with the door assembly near a lower hinge mounting point.

7. The vehicle body structure as claimed in claim 4, wherein rear ends of the first anti-crash beam, the second anti-crash beam, and the third anti-crash beam are fixed to the door assembly by soldering, and rear ends of the second anti-crash beam and the third anti-crash beam are connected together.

8. The vehicle body structure as claimed in claim 4, further comprising an A-pillar reinforcing block, wherein the A-pillar reinforcing block is fixed to the A-pillar near a lower hinge mounting point.

9. The vehicle body structure as claimed in claim 8, wherein a middle portion of the A-pillar reinforcement block defines a clamping groove for clamping with an edge of the A-pillar, and the A-pillar reinforcement block and the third anti-crash beam are in a straight line.

10. The vehicle body structure as claimed in claim 9, wherein the A-pillar reinforcing block is a cast structure, the middle portion of the A-pillar reinforcing block comprises a conical block protruding outwards with respect to two ends of the A-pillar reinforcing block, and the clamping groove extends through a bottom of the conical block.

11. The vehicle body structure according to claim 1, further comprising a fourth anti-crash beam, wherein the fourth anti-crash beam is installed in front of the engine compartment assembly, the fourth anti-crash beam is bent away from the engine compartment assembly, and a radius of curvature at both ends of the fourth anti-crash beam is smaller than a radius of curvature at a middle portion of the fourth anti-crash beam.

12. The vehicle body structure as claimed in claim 11, wherein the radius of curvature at both ends of the fourth anti-crash beam is 100 mm to 140 mm, and the radius of curvature at the middle portion of the fourth anti-crash beam is 2500 mm to 2900 mm.

13. A vehicle comprising:
a vehicle body structure comprising:
an A-pillar, a door assembly, an engine compartment assembly, an upper longitudinal beam of engine compartment, a reinforcement plate of upper longitudinal beam, a first anti-crash beam, and a second anti-crash beam;
wherein a front end of the reinforcement plate of upper longitudinal beam is connected to a middle portion of the upper longitudinal beam of engine compartment, a rear end of the reinforcement plate of upper longitudinal beam is connected to the engine compartment assembly, the upper longitudinal beam of the engine compartment and the reinforcement plate of upper longitudinal beam form a first triangle area on the engine compartment assembly, the first anti-crash beam and the second anti-crash beam are installed on the door assembly along a direction of front to rear of the vehicle body, and the first anti-crash beam is disposed above the second anti-crash beam;
wherein the second anti-crash beam and the reinforcement plate of upper longitudinal beam are in a straight line.

14. The vehicle as claimed in claim 13, wherein the first anti-crash beam is inclined downward toward the rear of the vehicle body and set on the door assembly, the first anti-crash beam and a lower frame of window form a second area on the door assembly, and the second area is substantially a triangle area.

15. The vehicle as claimed in claim 13, wherein cross-sections of the first anti-crash beam and the second anti-crash beam are irregular concave-convex structures.

16. The vehicle as claimed in claim 13, wherein the vehicle body structure further comprises a third anti-crash beam below the second anti-crash beam, the third anti-crash beam is installed on the door assembly along the direction of front to rear of the vehicle body, the second anti-crash beam and the third anti-crash beam form a third triangle area on the door assembly, and the third anti-crash beam is horizontally installed.

\* \* \* \* \*